United States Patent [19]
Brown

[11] Patent Number: 4,860,353
[45] Date of Patent: Aug. 22, 1989

[54] DYNAMIC FEEDBACK ARRANGEMENT SCRAMBLING TECHNIQUE KEYSTREAM GENERATOR

[75] Inventor: David S. Brown, Encinitas, Calif.

[73] Assignee: General Instrument Corporation, New York, N.Y.

[21] Appl. No.: 194,850

[22] Filed: May 17, 1988

[51] Int. Cl.$^4$ ............................................... H04L 9/04
[52] U.S. Cl. ..................................... 380/44; 380/50
[58] Field of Search ........................... 380/44–47, 380/50

[56] References Cited

U.S. PATENT DOCUMENTS

| | | | |
|---|---|---|---|
| 3,781,473 | 12/1973 | Good et al. ............................ | 380/46 |
| 3,911,330 | 10/1975 | Fletcher et al. ...................... | 380/50 |
| 4,274,085 | 6/1981 | Marino, Jr. ........................... | 380/47 |
| 4,343,967 | 8/1982 | McArdle .............................. | 380/44 |
| 4,434,322 | 2/1984 | Ferrell ................................... | 380/50 |
| 4,760,598 | 7/1988 | Ferrell ................................... | 380/44 |
| 4,797,921 | 1/1989 | Shiraishi ............................... | 380/44 |

FOREIGN PATENT DOCUMENTS 950360 7/1974 Canada .

*Primary Examiner*—Salvatore Cangialosi
*Attorney, Agent, or Firm*—Edward W. Callan

[57] ABSTRACT

A keystream generator including at least two feedback shift register structures. Each structure has input, intermediate and output stages through which data bits are shifted serially in response to a clock signal, a plurality of logic elements respectively located between predetermined pairs of register stages, means for feeding the data bit shifted from the output stage into the input stage and into predetermined ones of the logic elements in accordance with a polynomial code. The logic elements process a data bit shifted from the preceding stage with the data bit feedback from the output stage in accordance with the polynomial code for input into the succeeding register stage. The structure further includes means for processing the data bits shifted from a predetermined stage of each shift register structure to provide a keystream; and means for varying the polynomial code of at least one of the shift register structures by applying to the logic elements an enabling polynomial code signal that varies in accordance with the content of data bits shifted from a predetermined register range. The polynomial code of one of the shift register structures is not varied in response to the polynomial code signal. The bits that cause the polynomial code signal to be varied are not included in the keystream.

25 Claims, 3 Drawing Sheets

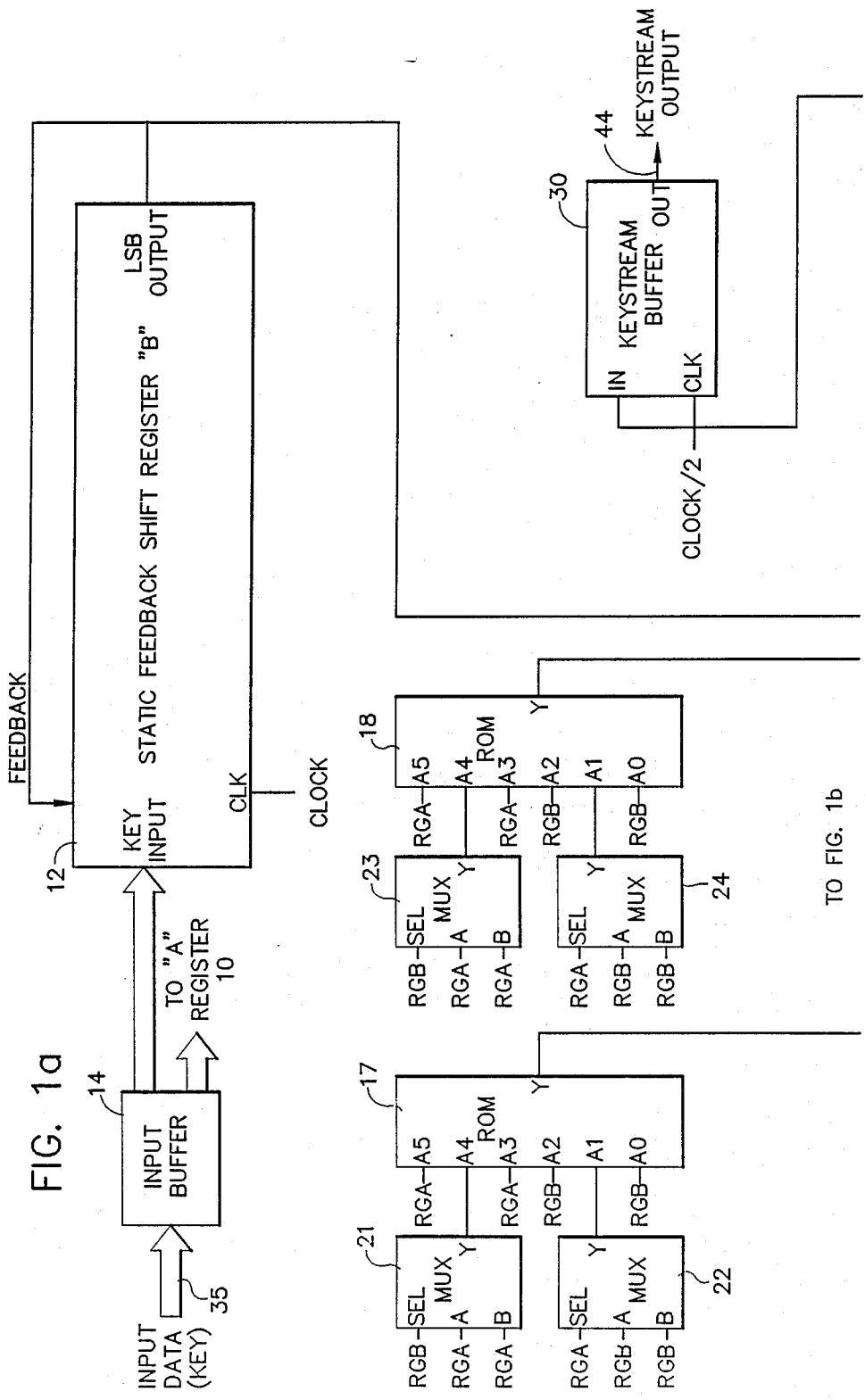

DYNAMIC FEEDBACK ARRANGEMENT SCRAMBLING TECHNIQUE KEYSTREAM GENERATOR

BACKGROUND OF THE INVENTION

The present invention generally pertains to scrambling of binary data and is particularly directed to keystream generation utilizing one or more feedback shift register structures.

Binary data may be scrambled (encrypted) by processing the binary data with a keystream. Typically a binary data signal and the keystream are added modulo-2 on a bit-by-bit basis by an exclusive-OR (XOR) gate logic element to produce a scrambled binary data signal. The keystream generator typically produces a keystream by processing an initializing binary encryption key containing a plurality of key data bits. The scrambled binary data signal may be descrambled by adding modulo-2 to the scrambled signal an identical keystream, generated synchronously by an identical keystream generator that is initialized with the same binary encryption key.

A prior art keystream generator utilizing a feedback shift register structure, includes a feedback shift register, having input, intermediate and output stages through which data bits are shifted serially in response to a clock signal, a plurality of logic elements respectively located between predetermined pairs of register stages, means for feeding the data bit shifted from the output stage into the input stage and into predetermined ones of the logic elements in accordance with a polynomial code, wherein the logic elements process a data bit shifted from the preceding stage with the data bit fedback from the output stage in accordance with the polynomial code for input into the succeeding register stage; and means for processing the data bits shifted from a predetermined stage to provide a keystream. The key data bits of the encryption key are loaded in parallel into the shift register structure to initialize the operation of the keystream generator. The processing means include a memory, such as a read only memory (ROM) that provides individual keystream bits in accordance with a memory address made up of data bits shifted from a plurality of the stages of the shift register. In one such prior art keystream generator, data bits shifted from two separate feedback shift registers are combined to make up the memory address.

SUMMARY OF THE INVENTION

The present invention provides a dynamic feedback arrangement scrambling technique (DFAST) keystream generator. The keystream generator of the present invention includes a feedback shift register structure, having input, intermediate and output register stages through which data bits are shifted serially in response to a clock signal, a plurality of logic elements respectively located between predetermined pairs of register stages, means for feeding the data bit shifted from the output stage into the input stage and into predetermined ones of the logic elements in accordance with a polynomial code, wherein the logic elements process a data bit shifted from the preceding stage with the data bit fedback from the output stage in accordance with the polynomial code for input into the succeeding register stage; means for processing the data bits shifted from a predetermined stage to provide a keystream; and means for varying the polynomial code by applying to the logic elements thereof a polynomial code signal that varies in accordance with the content of data bits shifted from a predetermined register stage. Accordingly, it is more difficult for unauthorized persons to duplicate the keystream than if the the polynomial code did not vary.

The keystream generator of the present invention may further include the following additional features, which further enhance the difficulty of duplicating the keystream without authorization.

The bits that cause the polynomial code signal to be varied are not included in the keystream.

The keystream generator further includes means for processing data bits from a predetermined register stage to provide a prekeystream; wherein alternate bits from the prekeystream are processed to cause the polynomial code signal to be varied; and wherein at least some of the remaining bits of the prekeystream are processed to provide the keystream.

The keystream generator further includes means for processing data bits shifted from a plurality of predetermined register stages to provide a prekeystream; wherein the means for varying the polynomial code signal do so in accordance with the contents of alternate bits of the prekeystream; and wherein the means for providing the keystream do so by processing at least some of the remaining bits of the prekeystream.

The means that provide the prekeystream include first memory means for providing individual prekeystream bits in accordance with the contents of a multi-bit address signal; and second memory means for providing some of the bits of the address signal in accordance with the contents of data bits shifted from some of said predetermined register states; wherein one of the bits of said multi-bit address signal is provided directly from one of said predetermined register stages.

The keystream generator further includes multiplexing means for selecting between data bits shifted from different ones of said predetermined register stages of for providing address bits for addressing the second memory means.

The selection by the multiplexing means between data bits shifted from different predetermined register stages is controlled in response to a data bit shifted from a different predetermined register stage.

The keystream generator further includes third memory means for providing individual codestream bits in accordance with the contents of said multi-bit address signal; and logic means for processing each data bit shifted from the output register stage with a bit in the codestream for input into the input stage and the predetermined ones of the logic elements of the shift register structure enabled by the polynomial code signal. The codestream is distint from the prekeystream.

In the preferred embodiment, the keystream generator includes two feedback shift register structures, with the polynomial code of only one of the two shift register structures being varied by the polynomial code signal. Data bits shifted from a plurality of predetermined stages of each shift register structure are combined and processed to provide the prekeystream; and the selection by the multiplexing means between data bits shifted from different predetermined stages of one shift register structure is controlled in response to a data bit shifted from a predetermined stage of the other shift register structure. In other respects, the two-shift-register-structure embodiment may utilize the features described above with respect to the one-shift-register-structure embodiment.

DESCRIPTION OF THE PREFERRED EMBODIMENT

Figure 1B:
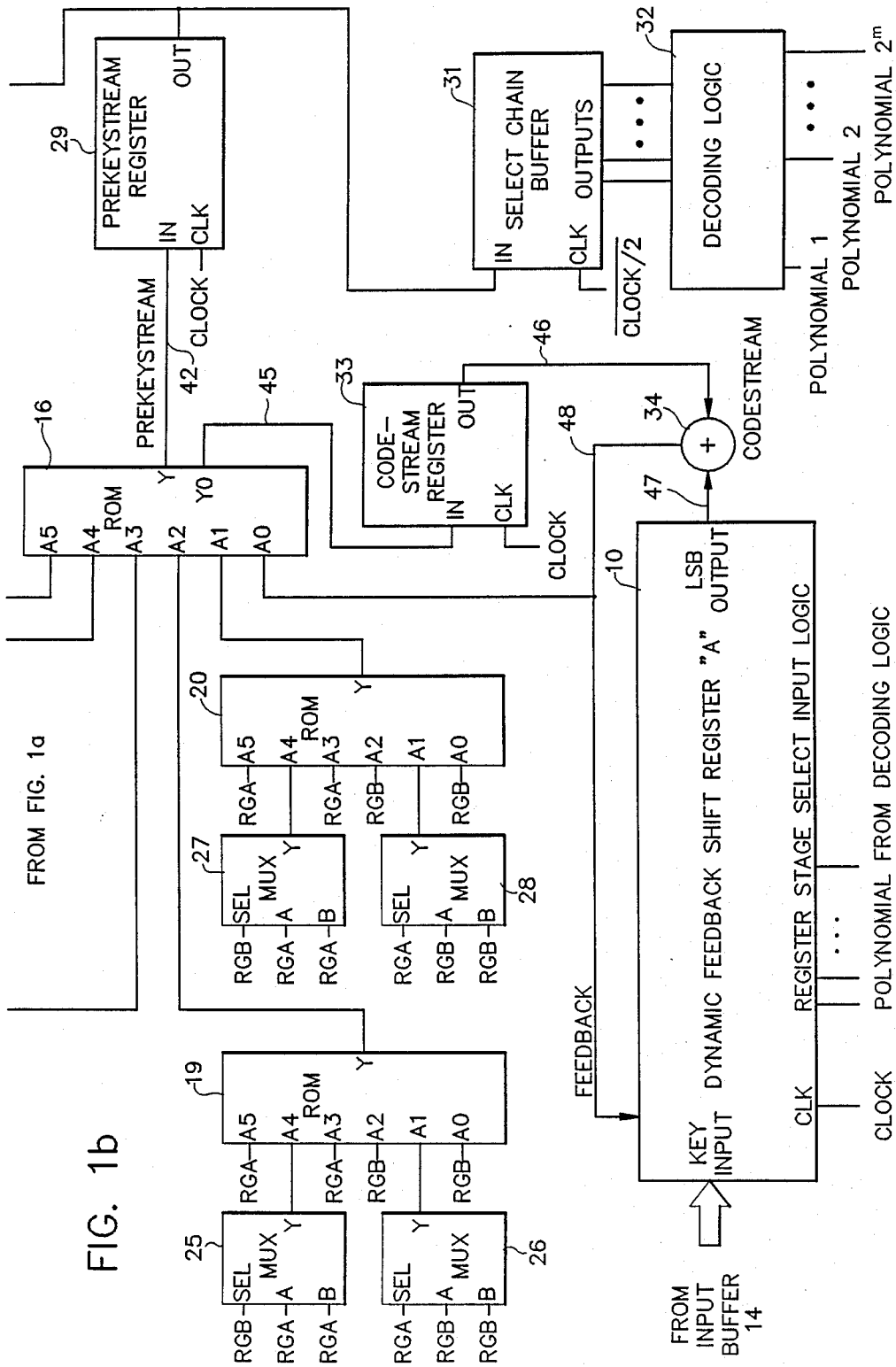
FIG. 1, which is a combination of FIGS. 1a and 1b, is a block diagram of a preferred embodiment of a keystream generator according to the present invention.

Referring to FIG. 1, a preferred embodiment of the keystream generator of the present invention includes a dynamic feedback shift register structure 10, a static feedback shift register structure 12, an input buffer 14, a plurality of ROMs 16, 17, 18, 19, 20, a plurality of multiplexers (MUXs) 21, 22, 23, 24, 25, 26, 27, 28, a prekeystream register 29, a keystream buffer 30, a select chain buffer 31, a decoding logic unit 32, a codestream register 33 and an XOR gate 34.

An input data key 35 is buffered by the input buffer 14. Half of the bits of the input data key are loaded in parallel from the input buffer 14 into the dynamic feedback shift register structure 10; and half of the bits of the input data signal are loaded in parallel from the input buffer 14 into the static feedback shift register structure 12.

Figure 2:
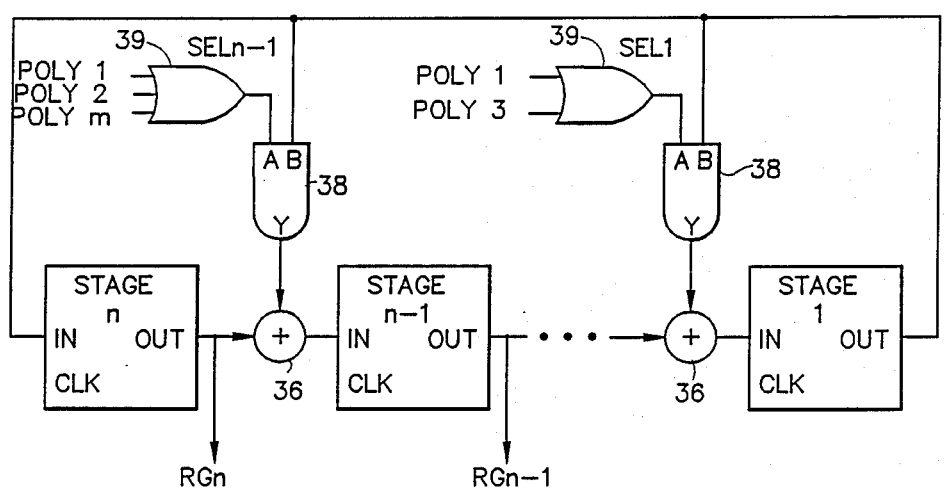
FIG. 2 is a block diagram of the dynamic feedback shift register structure included in the keystream generator of FIG. 1.

Referring to FIG. 2, the dynamic feedback shift register structure 10 includes "n" stages, with stage n being the input stage, stage 1 being the output stage, and stages 2 through n−1 being intermediate stages. In the shift register structure 10, the data bits are shifted serially from each stage in response to a clock signal applied to the CLK terminals. Data bits shifted from the register stages are provided respectively at output terminals RG1 through RGn. A plurality of XOR gates 36 are respectively located between predetermined pairs of the register stages. One input to each XOR gate 36 is provided from the preceding register stage; and the other input to each XOR gate 36 is fedback from output terminal RG1 of the output stage 1 via an AND gate 38. A polynomial code signal from the decoding logic unit 32 is applied through some of the OR gates 39 to respective SEL terminals of the AND gates 38, with only such AND gates 38 as are indicated by the applied polynomial code signal being enabled to pass the data bit RG1 fedback from the output register stage 1 output terminal to the XOR gate 36 connected thereto. The application of the polynomial code signal through the OR gates 39 to indicate which AND gates are enabled is discussed below following the description of the production of the polynomial code signals by the decoding logic unit 32.

The data bits shifted from a preceding register stage are processed by each XOR gate 36 with whatever fedback data bits as are passed thereto (if any) by the respective AND gate 38; and the output bits from the XOR gate 36 are clocked into the succeeding register stage. The combination of the XOR gate 36 and the AND gate 38 may be located between each pair of register stages or only between certain predetermined pairs of the register stages.

Figure 3:
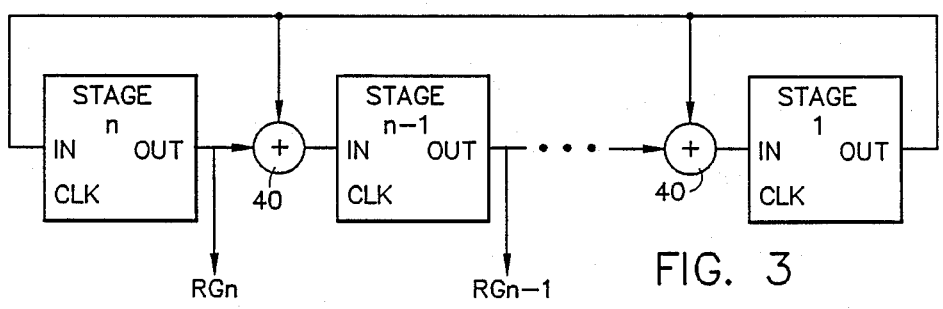
FIG. 3 is a block diagram of the static feedback shift register structure included in the keystream generator of FIG. 1.

Referring to FIG. 3, the static feedback shift register structure 12 includes "n" stages, with stage n being the input stage, stage 1 being the output stage, and stages 2 through n−1 being intermediate stages. In the shift register structure 12, the data bits are shifted serially from each stage in response to a clock signal applied to the CLK terminals. Data bits shifted from the register stages are provided respectively at output terminals RG1 through RGn. A plurality of XOR gates 40 are respectively located between predetermined pairs of the register stages. One input to each XOR gate 40 is provided from the preceding register stage; and the other input to each XOR gate 40 is fedback from output terminal RG1 of the output stage 1. The XOR gates 40 are not located between each pair of register stages, but are located between only predetermined pairs of register stages in accordance with a polynomial code. The data bits shifted from a preceding register stage are processed by each XOR gate 40 with the fedback data bits from the register output stage output terminal RG1; and the output bits from the XOR gate 40 are clocked into the succeeding register stage.

Referring again to FIG. 1, the ROM 16 provides individual prekeystream bits on line 42 from output terminal Y in accordance with the contents of an address signal provided at input terminals A0 through A5. The ROM 16 is a 2×64 bit ROM, which provides different combinations of outputs at the respective output terminals Y and YO in response to 64 different common addresses. In essence, the ROM 16 is a dual ROM that responds differently to common addresses.

Four of the bits in the address signal applied to the ROM 16 are provided respectively from the outputs of the four ROMs 17, 18, 19 and 20; and the other two bits of the address signal applied to the ROM 16 are provided directly from the respective output terminals of the two shift register structures 10, 12. These two bits are provided directly in the sense that they are not subject to intermediate processing by memory means, as data bits shifted out of the intermediate stages of the respective shift register structures 10, 12.

Each of the ROMs 17, 18, 19 and 20 provides an individual bit of the address signal applied to the ROM 16 in accordance with an address signal provided by data bits shifted from different predetermined stages of each of the shift register structures 10, 12. In FIG. 1, "RGA" indicates that the bit is shifted from a stage of the A shift register structure 10; and "RGB" indicates that the bit is shifted from a stage of the B shift register structure 12. In the address for each of the four ROMs 17, 18, 19, 20, two of the address bits are shifted directly from different stages of the A shift register structure 10, two of the address bits are shifted directly from different stages of the B shift register structure 12, one of the address bits is selected by a MUX 21, 23, 25, 27 between two bits shifted from different stages of the A shift register structure 10 in response to a data bit shifted from a stage of the B shift register structure 12; and one of the address bits is selected by a MUX 22, 24, 26, 28 between two bits shifted from different stages of the B shift register structure 12 in response to a data bit shifted from a stage of the A shift register structure 10. All of the address bits provided to the ROMs 16, 17, 18, 19, 20 are shifted from different stages of the shift register structures 10, 12.

The prekeystream on line 42 is clocked into the prekeystream register 29 at the system clock rate. Alternate bits of the prekeystream are clocked at one-half the system clock rate into the select chain buffer 31 by an inverted CLOCK/2 signal; and the remaining bits of the prekeystream are clocked at one-half the system clock rate into the keystream buffer 30 by a CLOCK/2 signal. All or a subset of the bits in the keystream buffer 30 are provided as required as a keystream output signal on line 44. This avoids placing contiguous bits of the prekeystream on line 42 into the keystream on line 44. This also assures that keystream bits are not used as signals to control selection of the polynomial code signals.

Figure 4:
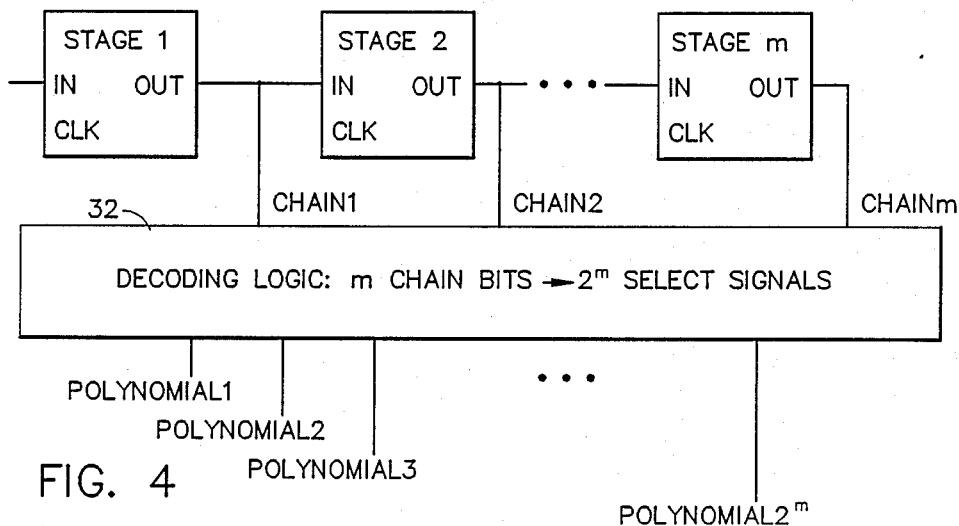
FIG. 4 is a block diagram of the select chain buffer and decoding logic units included in the keystream generator of FIG. 1.

The combination of the select chain buffer 31 and decoding logic unit 32 is shown in greater detail in FIG. 4. The select chain buffer 31 is a serial shift register including "m" stages, stage 1, stage 2, . . . , stage m through which alternate bits from the prekeystream register 29 are clocked at one-half the system clock rate by the inverted CLOCK/2 clock signal applied to the CLK terminals. Chain bits, CHAIN1, CHAIN2, . . . , CHAINm, are clocked out of the respective stages of the select chain buffer 31 into the decoding logic unit 32. In one embodiment the decoding logic unit 32 is a ROM that can provide up to $2^m$ different polynomial code signals, POLYNOMIAL1, POLYNOMIAL2, POLYNOMIAL3, . . . , POLYNOMIAL$2^m$, in response to $2^m$ different ROM addresses provided by the m chain bits. The decoding logic unit 32 uses the bits stored by the select chain buffer 31 to decode a particular polynomial, setting a single signal corresponding to a particular polynomial true while keeping all other polynomial signals false.

Any rule for decoding the select chain buffer bits into signals selecting the appropriate polynomial code signals may be used provided there is a fixed 1:1 or 2:1 mapping taking place. For every bit pattern present in the select chain buffer 31, there can be only one polynomial code signal that is true. A particular polynomial code signal, however, might be selected by two different bit patterns in the select chain buffer 31. This latter case occurs when the number of polynomials used is not an even power of two.

The select chain buffer 31 stores as many successive alternate bits from the prekeystream register 29 as are necessary to select between the desired number of different polynomial code signals. The size of chain is the highest value of m such that $2^{m-1}$ is less than the number of polynomial code signals and $2^m$ is greater than or equal to the number of polynomial code signals. For example, if seven different polynomials were desired, one would provide a select chain buffer 31 having m=3 stages, since $2^3=8$, which is greater that 7 while $2^2=4$ is less than 7.

The selected polynomial code signal is provided to the register stage select input logic of the dynamic feedback shift register structure 10. The register stage select input logic of the dynamic shift register structure 10 includes the AND gates 38 and the OR gates 39 shown in FIG. 2. The OR gate 39 included in the logic elements 36, 38, 39 related to a given register stage is connected to the decoding logic unit 32 to receive only those polynomial code signals that enable the logic elements 36, 38 for that register stage to process the data bit RG1 that is fed back from the output register stage.

Thus the register select logic is simply a logic-OR function. For any given register-stage within a dynamic register structure, selection of the feedback to the selector for that stage is accomplished according to the following formula:

Select=TRUE if that register stage is part of the polynomial, FALSE if not.

So each SEL signal is a logical OR of however many POLYNOMIAL signals that register stage is involved in.

The select signals, SEL n−1 . . . , SEL 1, are logical 1 (true) if the OR gate 39 of the related register stage receives a true polynomial code signal from the decoding logic unit 32. This allows the fedback bit RG1 to be provided by the AND gate 38 to the XOR gate 36. If a select signal is false, the related AND gate output is also false, and the related XOR gate is effectively removed from the input to the succeeding register stage. The polynomial code signal components applied to an individual AND gate 38 are SELn=POLYNOMIAL1+. . . +POLYNOMIALm where n is the register-stage number, m is the number of different polynomials used, + is logical OR, and only polynomials applied to that particular register-stage are included. The POLYNOMIAL signals are generated by decoding bits from the select chain buffer 31.

Accordingly, the different polynomial codes are defined by the connections between the decoding logic unit 32 and the output terminals of the OR gates 39; wherein different OR gate 39 input terminals are connected to different sets of decoding logic unit 32 output terminals.

In another preferred embodiment, only two different polynomial code signals are provided by the decoding logic unit 32. Each of the polynomial codes is primitive and irreducible so each would, on its own, generate a maximal length sequence.

The select chain buffer for this embodiment needs only one stage, since only two different polynomial codes are used in the dynamic feedback shift register structure 10. Therefore in this case, every other prekeystream bit is used directly to select between the polynomial code signals, whereby the decoding logic unit 32 includes a simple logic inverter gate. The output of the single stage of select chain buffer 31 thus becomes the polynomial code signal POLYNOMIAL1, and its inverse becomes the polynomial code signal POLYNOMIAL2. In this embodiment, the OR gates 39 are not included in the register stage select input logic, since the SEL input to an AND gate indicated by only one polynomial code signal is connected directly to the decoding logic unit 32 output that provides such polynomial code signal; and for those stages indicated by both polynomial code states, the AND gate 38 also is eliminated and the fed back data bit RG1 is provided directly to the XOR gate 36. Register stages that are not indicated by either polynomial code signal are connected directly to the output of the preceding stage.

The fedback signal RG1 is applied to the input of the input register stage n regardless of which polynomial code signal is used.

Because the polynomial code signal cannot change more frequently than one-half the system clock rate, in accordance with the rate at which the alternate prekeystream bits are clocked into the select chain buffer 31, the polynomial code applied to the dynamic feedback shift register structure 10 by each polynomial code signal remains applicable for two system clock periods.

The codestream register 33 receives codestream bits on line 45 from the YO output terminal of the ROM 16 in response to the address signal applied to the ROM 16. The codestream bits are clocked through the codestream register 33 onto line 46 and added modulo-2 by the XOR gate 34 with the data bits shifted from the LSB output stage (stage 1) of the dynamic feedback shift register structure 10 to provide on line 48 the data bit RG1 that is fed back to the input stage (stage n) and predetermined intermediate stages of the shift register structure 10 in accordance with the applied polynomial code. The data bit on line 48 is also provided to the ROM 16 as part of the multi-bit address applied thereto.

In the preferred embodiment, each feedback shift register structure 10, 12 has 32 stages. The static feedback shift register structure 12 implements a primitive, irreducible polynomial of degree 32 to generate a maximal-length binary sequence of length $2^{32}-1$. This insures that the length of the keystream output sequence will also be at least $2^{32}-1$ before repeating.

Twenty out of the 32 register output terminals from each of the feedback shift register structures 10, 12 (40 outputs total) are tapped as inputs to the ROMs 16, 17, 18, 19, 20, and the MUXs 21, 22, 23, 24, 25, 26, 27, 28. Each tap is tapped only once as an input.

This structure can implement any number of different polynomials of degree 32.

It is also preferred that any two inputs to a particular ROM 17, 18, 19, 20 are shifted from register stages that have at least one XOR gate 36, 40 between them.

The output maps of each of the ROMs 16, 17, 18, 19, 20 preferably obey the following rules:

They must contain an equal number of ones and zeros.

The ones (and hence zeros) must be distributed on an even basis in a row/column format equal to the square root of the size of the map. The figure shows a map size of 64, hence the number of ones and zeros must be equal in every group of 8 locations. They must also be equally distributed every 8 locations. In other words, if the contents are written out in an equal number of rows and columns from upper left to lower right, all rows and all columns have an equal number of ones and zeros, that is: four ones and four zeros.

No square-root sized pattern may be used more than twice; once as a row and once as a column. No 8-bit row pattern is repeated as a row, and no 8-bit column pattern is repeated as a column. If a larger mapping function were used, it would be desirable to use each square-root sized pattern only once; but in a map of size 64 this is not possible.

There are many combinations of mapping functions that will meet these requirements, although the number is finite. In fact, for a map size of 64, there are 70 unique ways to arrange four 1's in eight places in a binary set. Since the preferred embodiment requires, effectively, 6 maps of 64 locations (8 rows of 8), only 48 of the 70 possible patterns are needed as rows. This means that no row needs to be used more than once, hence no row will be used more than once. Likewise, each column is used only once, although some patterns do appear once as a row and once as a column.

The operation of a preferred embodiment of the keystream generator is as follows. A key 35 having a 64-bit initial value is loaded by the input buffer 35 into the two feedback shift register structures 10, 12. The register structures 10, 12 then shift with every subsequent cycle of the system clock signal. In fact the keystream generator is synchronous with the system clock signal. During each clock cycle, an individual prekeystream bit is provided on line 42 to the prekeystream register 29.

The prekeystream registered in the prekeystream register 29 is then subdivided by the alternate CLOCK/2 and inverted CLOCK/2 clock inputs to the keystream buffer 30 and the select chain buffer 31 to produce a keystream on line 44 for use in encryption or decryption and to produce the contents of the select chain buffer 31 for selecting between the various predetermined polynomial code signals.

I claim:

1. A keystream generator, comprising
   a feedback shift register structure, having input, intermediate and output stages through which data bits are shifted serially in response to a clock signal, a plurality of logic elements respectively located between predetermined pairs of register stages, means for feeding the data bit shifted from the output stage into the input stage and into predetermined ones of the logic elements in accordance with a polynomial code, wherein the logic elements process a data bit shifted from the preceding stage with the data bit fedback from the output stage in accordance with the polynomial code for input into the succeeding register stage;
   means for processing the data bits shifted from a predetermined stage to provide a keystream; and
   means for varying the polynomial code by applying to the logic elements an enabling polynomial code signal that varies in accordance with the content of data bits shifted from a predetermined register stage.

2. A keystream generator according to claim 1, wherein the bits that cause the polynomial code signal to be varied are not included in the keystream.

3. A keystream generator according to claim 1, further comprising
   means for processing data bits shifted from a plurality of predetermined register stages to provide a prekeystream;
   wherein the means for varying the polynomial code signal do so in accordance with the contents of alternate bits of the prekeystream; and
   wherein the means for providing the keystream do so by processing at least some of the remaining bits of the prekeystream.

4. A keystream generator according to claim 3, wherein the means that provide the prekeystream include
   first memory means for providing individual prekeystream bits in accordance with the contents of a multi-bit address signal; and
   second memory means for providing some of the bits of the address signal in accordance with the contents of data bits shifted from some of said predetermined register stages;
   wherein at least one of the bits of said multi-bit address signal is provided directly from one of said predetermined register stages.

5. A keystream generator according to claim 4, further comprising
   multiplexing means for selecting between data bits shifted from different ones of said predetermined register stages for providing address bits for addressing the second memory means.

6. A keystream generator according to claim 5, wherein the selection by the multiplexing means between data bits shifted from different predetermined register stages is controlled in response to a data bit shifted from a different predetermined register stage.

7. A keystream generator according to claim 4, further comprising
third memory means for providing individual codestream bits in accordance with the contents of said multi-bit address signal; and
logic means for processing each data bit shifted from the output register stage with a bit in the codestream for input into the input stage and the predetermined ones of the logic elements of the shift register structure enabled by the polynomial code signal.

8. A keystream generator according to claim 3, further comprising
means for processing data bits shifted from a plurality of predetermined register stages to provide a codestream that is distinct from the prekeystream; and
logic means for processing each data bit shifted from the output register stage with a bit in the codestream for input into the input stage and the predetermined ones of the logic elements of the shift register structure enabled by the polynomial code signal.

9. A keystream generator according to claim 1, further comprising
means for processing data bits shifted from a plurality of predetermined register stages to provide a codestream; and
logic means for processing each data bit shifted from the output register stage with a bit in the codestream for input into the input stage and the predetermined ones of the logic elements of the shift register structure enabled by the polynomial code signal.

10. A keystream generator according to claim 9, wherein the means that provide the codestream bits include
first memory means for providing each codestream bit in accordance with the contents of a multi-bit address signal; and
second memory means for providing some of the bits of the address signal in accordance with the contents of data bits shifted from some of said predetermined register stages;
wherein at least one of the bits of said multi-bit address signal is provided directly from one of said predetermined register stages.

11. A keystream generator according to claim 10, further comprising
multiplexing means for selecting between data bits shifted from different ones of said predetermined register stages for providing address bits for addressing the second memory means.

12. A keystream generator according to claim 11, wherein the selection by the multiplexing means between data bits shifted from different predetermined register stages is controlled in response to a data bit shifted from a different predetermined register stage.

13. A keystream generator, comprising
at least two feedback shift register structures, each having input, intermediate and output stages through which data bits are shifted serially in response to a clock signal, a plurality of logic elements respectively located between predetermined pairs of register stages, means for feeding the data bit shifted from the output stage into the input stage and into predetermined ones of the logic elements in accordance with a polynomial code, wherein the logic elements process a data bit shifted from the preceding stage with the data bit fedback from the output stage in accordance with the polynomial code for input into the succeeding register stage;
means for processing the data bits shifted from a predetermined stage of each shift register to provide a keystream; and
means for varying the polynomial code of at least one of the shift register structures by applying to the logic elements an enabling polynomial code signal that varies in accordance with the content of data bits shifted from a predetermined register stage.

14. A keystream generator according to claim 13, wherein the polynomial code of one of the shift register structures is not varied in response to the polynomial code signal.

15. A keystream generator according to claim 13, wherein the bits that cause the polynomial code signal to be varied are not included in the keystream.

16. A keystream generator according to claim 13, further comprising
means for processing data bits shifted from a plurality of predetermined stages of each shift register structure to provide a prekeystream;
wherein the means for varying the polynomial code signal do so in accordance with the contents of alternate bits of the prekeystream; and
wherein the means for providing the keystream do so by processing at least some of the remaining bits of the prekeystream.

17. A keystream generator according to claim 16, wherein the means that provide the prekeystream include
first memory means for providing individual prekeystream bits in accordance with the contents of a multi-bit address signal; and
second memory means for providing some of the bits of the address signal in accordance with the contents of data bits shifted from some of said predetermined stages of each shift register structure;
wherein at least one of said predetermined stages of each shift register structure directly provides a bit of said multi-bit address signal.

18. A keystream generator according to claim 17, further comprising
multiplexing means for selecting between data bits shifted from different ones of said predetermined register stages for providing address bits for addressing the second memory means.

19. A keystream generator according to claim 18, wherein the selection by the multiplexing means between data bits shifted from different predetermined stages of one shift register structure is controlled in response to a data bit shifted from a predetermined stage of another shift register structure.

20. A keystream generator according to claim 17, further comprising
third memory means for providing individual codestream bits in accordance with the contents of said multi-bit address signal; and
logic means for processing each data bit shifted from the output register stage with a bit in the codestream for input into the input stage and the predetermined ones of the logic elements of said one shift register structure enabled by the polynomial code signal.

21. A keystream generator according to claim 16, further comprising
   means for processing data bits shifted from a plurality of predetermined stages of each shift register structure to provide a codestream that is distinct from the prekeystream; and
   logic means for processing each data bit shifted from the output register stage of one of the shift register structures with a bit in the codestream for input into the input stage and the predetermined ones of the logic elements of said one shift register structure enabled by the polynomial code signal.

22. A keystream generator according to claim 13, further comprising
   means for processing data bits shifted from a plurality of predetermined stages of each shift register structure to provide a codestream; and
   logic means for processing each data bit shifted from the output register stage with a bit in the codestream for input into the input stage and the predetermined ones of the logic elements of said one shift register structure enabled by the polynomial code signal.

23. A keystream generator according to claim 22, wherein the means that provide the codestream bits include
   first memory means for providing each codestream bit in accordance with the contents of a multi-bit address signal; and
   second memory means for providing some of the bits of the address signal in accordance with the contents of data bits shifted from some of said predetermined stages of each shift register structure;
   wherein at least one of said predetermined stages of each shift register structure directly provides a bit of said multi-bit address signal.

24. A keystream generator according to claim 23, further comprising
   multiplexing means for selecting between data bits shifted from different ones of said predetermined stages of the shift register structures for providing address bits for addressing the second memory means.

25. A keystream generator according to claim 24, wherein the selection by the multiplexing means between data bits shifted from different predetermined stages of one shift register structure is controlled in response to a data bit shifted from a predetermined stage of another shift register structure.

* * * * *